UNITED STATES PATENT OFFICE.

WILHELM HASENBACH, OF MANNHEIM, GERMANY.

RECOVERY OF TIN FROM SCRAPS OF TINNED PLATE.

SPECIFICATION forming part of Letters Patent No. 363,136, dated May 17, 1887.

Application filed March 12, 1886. Serial No. 194,996. (No specimens.)

*To all whom it may concern:*

Be it known that I, WILHELM HASENBACH, a subject of the Emperor of Germany, and a resident of Mannheim, Germany, have invented new and useful Improvements in the Recovery of Tin from Scraps of Tinned Plate, of which the following is a specification.

This invention relates to an improved process of recovering tin from scraps of tinned plate by means of hydrochloric acid.

In all the processes of recovering tin from scraps of tinned plate by hydrochloric acid in a liquid or gaseous state a product is obtained which contains, besides protochloride of tin, protochloride of iron, but the latter in such varying quantities that the product cannot be directly used.

By means of the present process the solution of protochloride of tin and protochloride of iron obtained in the recovery of the tin from scraps of tinned plate by hydrochloric acid can be treated in a comparatively inexpensive manner, and the greatest parts of the hydrochloric acid used and of the dissolved iron are reobtained. According to the said process, the combined solutions of protochloride of tin and protochloride of iron are mixed, while being agitated in closed vessels at the ordinary temperature, with finely-divided carbonate of lime until a sample of the filtered liquid no longer contains tin. Iron protochloride is not precipitated in this process by the carbonate of lime, as the precipitation takes place in closed vessels and in an atmosphere of carbonic-acid gas. The oxyprotochloride of tin is not soluble in the cold liquid in presence of a very slight excess of carbonate of lime, and it can be separated from the lye of protochloride of iron and chloride of calcium by a filter-press. These expressed lyes contain, besides protochloride of iron, as much chloride of calcium as corresponds with half the equivalent of the tin which was contained therein. These lyes are subsequently evaporated and the product is decomposed by sulphuric acid in a sulphate-oven, and all the hydrochloric acid contained therein is recovered, and the decomposing product, consisting of gypsum and protosulphate of iron, is treated so as to obtain green vitriol. The pressed protochloride of tin is suspended in water in a second closed vessel, and while being boiled is treated with fresh quantities of finely-divided carbonate of lime until all oxyprotochloride is converted into protoxide. Any protochloride of iron which may still be mixed with the oxyprotochloride cannot be precipitated. Pure protoxide of tin is obtained if the operation is properly conducted. The protoxide of tin is separated from the lye containing chloride of calcium and a little protochloride of iron by pressing it and then carefully washing the same until chlorine can no longer be traced in the washing-water. It can then either be reduced to metal or treated directly to obtain tin salts.

In works of great extent considerable quantities of pure carbonic acid are obtained, which can with advantage be utilized for industrial purposes. In lieu of the carbonate of lime, any carbonic-acid combinations of the alkaline earths can be used.

I am aware that chalk or carbonate of lime has been used for the purpose in question; but in all processes based on the use of chalk the latter is used in one operation only, while in the present process for attaining the desired result two operations are described to be necessary—viz., one operation by ordinary temperature and one by high temperature. If only one operation is used, tin free from iron will never be obtained, because if, as hitherto in use, chalk is used only at common temperature, oxyprotochloride of tin is obtained, and not protoxide of tin, but, together with the oxyprotochloride of tin, also oxyprotochloride of iron is obtained. For separating the said two oxyprotochlorides it is necessary that the operation take place in a closed vessel, so as to prevent the carbonic acid developed from escaping. In the presence of said carbonic acid the oxyprotochloride of iron remains soluble in the solution of chlorite of calcium formed, while the oxyprotochloride of tin is insoluble and can be separated from the liquor by means of a filter-press. The so-obtained oxyprotochloride of tin, free from iron, can then be converted into protoxide of tin, free from iron, by treating the same in a closed vessel by a new quantity of chalk at a high temperature, when immediately the protochloride is formed. This protochloride, free from iron, can be used directly or converted into metallic iron by well-known processes. If the lye should be treated with chalk directly at high temperature, one would obtain chloride of iron; but this would be strongly polluted by chloride of iron. From this it will be seen that if a product free from iron shall be obtained it is absolutely necessary to use two operations, both with chalk, but the first at common temperature and the second by high temperature, both operations having to take place in closed vessels in order to maintain an atmosphere of carbonic acid.

I claim—

The process of obtaining protoxide of tin from lyes containing protochloride of tin and protochloride of iron which are obtained in the recovery of the tin from scraps of tin-plate by hydrochloric acid, which process consists in treating these lyes first at common temperature in closed vessels with finely-pulverized carbonate of lime in excess, separating the formed insoluble oxyprotochloride of tin from the dissolved oxyprotochloride of iron, and treating afterward the so-obtained oxyprotochloride of tin free from iron by a second quantity of carbonate of lime at high temperature in closed vessels, whereby the said oxyprotochloride of tin is converted into protoxide of tin, as specified.

In testimony whereof I have signed my name to this specification in the presence of two subscribing witnesses.

WILHELM HASENBACH.

Witnesses:
CARL TWIETMEYER,
HARRY E. HAMMOND.